(12) United States Patent
Chaves et al.

(10) Patent No.: US 11,558,091 B2
(45) Date of Patent: Jan. 17, 2023

(54) COEXISTENCE OF CELLULAR NETWORKS WITH AERONAUTICAL RADIO ALTIMETERS

(71) Applicant: NOKIA TECHNOLOGIES OY, Espoo (FI)

(72) Inventors: Fabiano de Sousa Chaves, Morris Plains, NJ (US); Iwajlo Angelow, Buffalo Grove, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/200,307

(22) Filed: Mar. 12, 2021

(65) Prior Publication Data

US 2022/0294504 A1   Sep. 15, 2022

(51) Int. Cl.
| | | |
|---|---|---|
| H04B 7/0456 | (2017.01) | |
| H04W 24/10 | (2009.01) | |
| H04B 17/10 | (2015.01) | |
| G01S 13/88 | (2006.01) | |

(52) U.S. Cl.
CPC .......... H04B 7/0465 (2013.01); G01S 13/882 (2013.01); H04B 17/102 (2015.01); H04W 24/10 (2013.01)

(58) Field of Classification Search
CPC ............ H04W 52/243; H04W 52/244; H04W 52/247
See application file for complete search history.

(56) References Cited

FOREIGN PATENT DOCUMENTS

WO   WO-2007060031 A1 *  5/2007  ........ H04W 52/0229

OTHER PUBLICATIONS

RTCA, Inc., "Assessment of C-Band Mobile Telecommunications Interference Impact on Low Range Radar Altimeter Operations", RTCA Paper No. 274-20/PMC-2073), Oct. 7, 2020, Internet: www.rtca.org, 231 pages,.
Federal Communications Commission, FCC 20-22, Before the Federal Communications Commission, Washington, DC 20554, In the Matter of Expanding Flexible Use of the 3.7 to 4.2 GHz Band, GN docket No. 18-122, Report and Order and Order of Proposed Modification, Adopted: Feb. 28, 2020, Released Mar. 3, 2020, 258 pages.
International Civil Aviation Organization (ACP-WG-F30/WP-14), Working Paper, Aeronautical Communications Panel (ACP), 30th Meeting of the Working Group F (WG F), Pattaya, Thailand Mar. 13-19, 2014, Agenda Item 7: WRC Agenda Items, 9 pages.
(Continued)

*Primary Examiner* — Kevin Kim
(74) *Attorney, Agent, or Firm* — Squire Patton Boggs (US) LLP

(57) ABSTRACT

Systems, methods, apparatuses, and computer program products for coexisting cellular networks with aeronautical radio altimeters. The method may include receiving a first command from a network manager to reduce emissions. The method may also include reducing the emissions based on the received first command In certain example embodiments, the first command may be for one or more network nodes in a cluster including the network node.

19 Claims, 9 Drawing Sheets

(56) References Cited

OTHER PUBLICATIONS

International Telecommunication Union, ITU-R Radiocommunication Sector of ITU, Recommendation Itu-R M.2059-0 (Feb. 2014), "Operational and technical characteristics and protection criteria of radio altimeters utilizing the band 4 200-4 400 MHz", M Series Mobile, radiodetermination, amateur and related satellite services, 24 pages.

Ofcom, Enabling wireless innovation through local licensing, Shared access to spectrum supporting mobile technology, Publication Date: Jul. 25, 2019, 97 pages.

3GPP TSG RAN WG3 Meeting #65, R3-091929, Aug. 24-28, 2009, Shenzhen, China, Nokia Siements Networks, "De-centralized optimization of downlink transmit power", 3 pages.

Radiocommunication Study Groups, ITU, Source: Documents 5D/TEMP/422(Rev. 2), Annex 4.4 to Document 5D/716-E, Jun. 29, 2021, English only, Annex 4.4 to Working Party 5D Chairman's Report, "Characteristics of Terrestrial Domponent of IMT for Sharing and Compatibility Studies in Preparation for WRC-23", 28 pages.

\* cited by examiner

COEXISTENCE OF CELLULAR NETWORKS WITH AERONAUTICAL RADIO ALTIMETERS

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for coexisting cellular networks with aeronautical radio altimeters.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments may be directed to a method. The method may include receiving, at a network node, a first command from a network manager to reduce emissions. The method may also include reducing the emissions based on the received first command In certain example embodiments, the first command may be for one or more network nodes in a cluster including the network node.

Other example embodiments may be directed to an apparatus. The apparatus may include at least one processor and at least one memory including computer program code. The at least one memory and computer program code may be configured to, with the at least one processor, cause the apparatus at least to receive a first command from a network manager to reduce emissions. The apparatus may also be caused to reduce the emissions based on the received first command According to certain example embodiments, the first command may be for one or more network nodes in a cluster including the apparatus.

Other example embodiments may be directed to an apparatus. The apparatus may include means for receiving a first command from a network manager to reduce emissions. The apparatus may also include means for reducing the emissions based on the received first command According to certain example embodiments, the first command may be for one or more network nodes in a cluster including the apparatus.

In accordance with other example embodiments, a non-transitory computer readable medium may be encoded with instructions that may, when executed in hardware, perform a method. The method may include receiving, at a network node, a first command from a network manager to reduce emissions. The method may also include reducing the emissions based on the received first command In certain example embodiments, the first command may be for one or more network nodes in a cluster including the network node.

Other example embodiments may be directed to a computer program product that performs a method. The method may include receiving, at a network node, a first command from the network manager to reduce emissions. The method may also include reducing the emissions based on the received first command In certain example embodiments, the first command may be for one or more network nodes in a cluster including the network node.

Other example embodiments may be directed to an apparatus that may include circuitry configured to receive a first command from a network manager to reduce emissions. The apparatus may also include circuitry configured to reduce the emissions based on the received first command. In certain example embodiments, the first command may be for one or more network nodes in a cluster including the apparatus.

Certain example embodiments may be directed to a method. The method may include receiving a measurement report including a measuring result of at least one radio altimeter signal. The method may also include determining a cluster of network nodes based on the measurement report. The method may further include determining emission reduction for the network nodes in the cluster. In addition, the method may include transmitting at least one command to the cluster of network nodes to perform the emission reduction.

Other example embodiments may be directed to an apparatus. The apparatus may include at least one processor and at least one memory including computer program code. The at least one memory and computer program code may be configured to, with the at least one processor, cause the apparatus at least to receive a measurement report including a measuring result of at least one radio altimeter signal. The apparatus may also be caused to determine a cluster of network nodes based on the measurement report. The apparatus may further be caused to determine emission reduction for the network nodes in the cluster. In addition, the apparatus may be caused to transmit at least one command to the cluster of network nodes to perform the emission reduction.

Other example embodiments may be directed to an apparatus. The apparatus may include means for receiving a measurement report including a measuring result of at least one radio altimeter signal. The apparatus may also include means for determining a cluster of network nodes based on the measurement report. The apparatus may further include means for determining emission reduction for the network nodes in the cluster. In addition, the apparatus may include means for transmitting at least one command to the cluster of network nodes to perform the emission reduction.

In accordance with other example embodiments, a non-transitory computer readable medium may be encoded with instructions that may, when executed in hardware, perform a method. The method may include receiving a measurement report including a measuring result of at least one radio altimeter signal. The method may also include determining a cluster of network nodes based on the measurement report. The method may further include determining emission reduction for the network nodes in the cluster. In addition, the method may include transmitting at least one command to the cluster of network nodes to perform the emission reduction.

Other example embodiments may be directed to a computer program product that performs a method. The method may include receiving a measurement report including a measuring result of at least one radio altimeter signal. The method may also include determining a cluster of network nodes based on the measurement report. The method may further include determining emission reduction for the network nodes in the cluster. In addition, the method may include transmitting at least one command to the cluster of network nodes to perform the emission reduction.

Other example embodiments may be directed to an apparatus that may include circuitry configured to receive a measurement report including a measuring result of at least one radio altimeter signal. The apparatus may also include circuitry configured to determine a cluster of network nodes based on the measurement report. The apparatus may further include circuitry configured to determine emission reduction for the network nodes in the cluster. In addition, the apparatus may include circuitry configured to transmit at least one command to the cluster of network nodes to perform the emission reduction.

BRIEF DESCRIPTION OF THE DRAWINGS

For proper understanding of example embodiments, reference should be made to the accompanying drawings, wherein.

DETAILED DESCRIPTION

Figure 1:
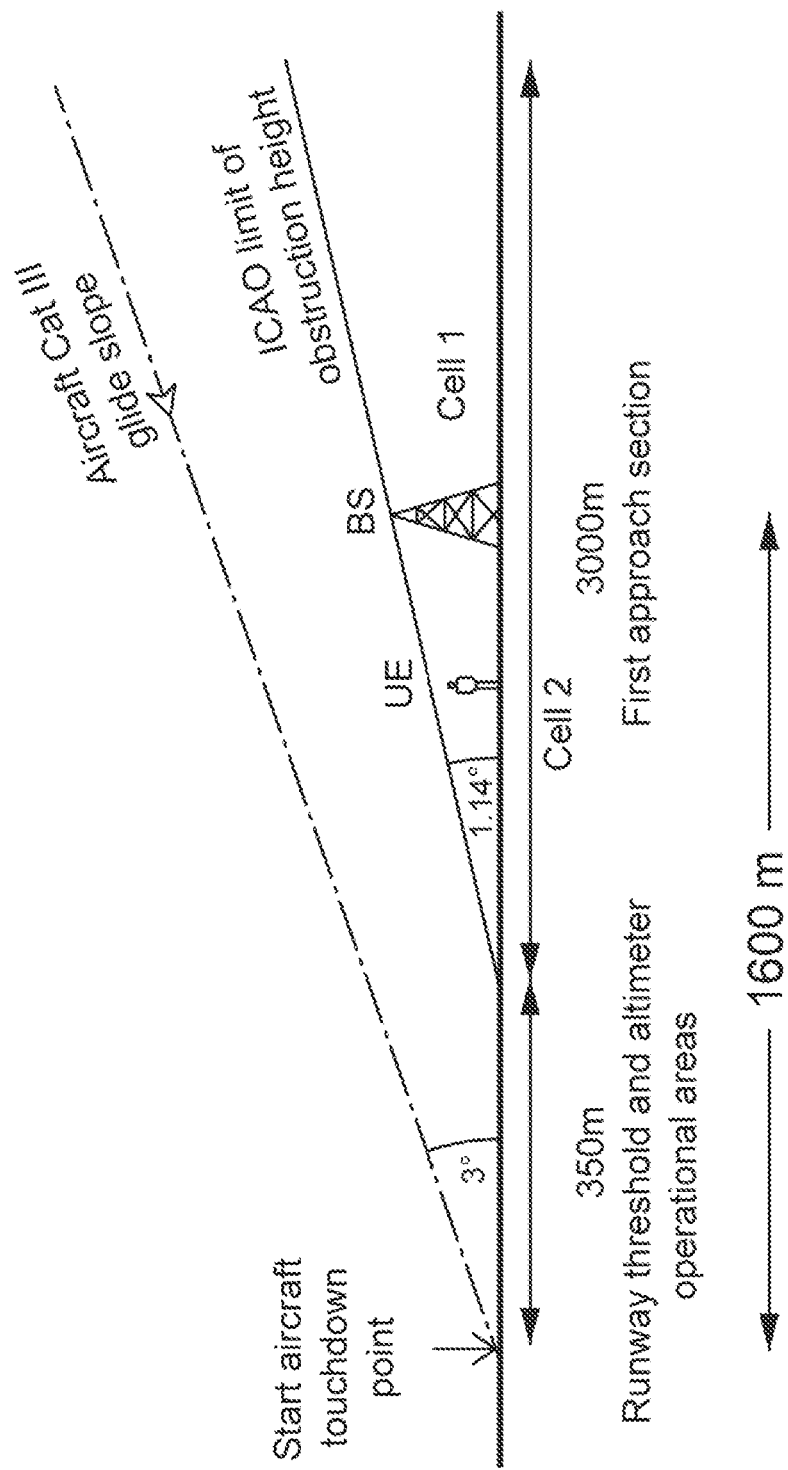
FIG. 1 illustrates an example interference scenario.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for coexisting cellular networks with aeronautical radio altimeters.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Radio altimeters (RAs) are important components of aeronautical operational systems. RAs may be present in airplanes and helicopters as part of ground proximity and collision avoidance systems, and may be used during the landing procedure of these aircrafts. Aeronautical RAs may function as radars that operate with separate transmit and receive antennas directed to the ground. In particular, frequency modulated carrier wave signals may be transmitted toward the ground, and the reflected signal may be received and processed to estimate the aircraft's altitude. Additionally, aeronautical RAs may have a worldwide spectrum allocation for operation in the 4.2-4.4 GHz frequency band.

New frequency bands have been unlocked for the operation of cellular communication systems, such as 4G and 5G, including so called "5G mid-bands" or "C-band", which are adjacent to the lower edge of the 4.2-4.4 GHz band where RAs operate. An example is the US 3.7-3.98 GHz band for high power 5G deployments, according to the Federal Communications Commission (FCC). Other example bands include those designated in Japan (3600-4100 MHz) and the UK (3805-4195 MHz). These new bands may be considered important for 5G deployments.

In certain cases, RAs may be susceptible to interference from 5G base stations (BSs) in-band and out-of-band (OOB) emissions. For instance, with 5G networks operating in frequency bands below 4.2 GHz, 5G OOB emissions at 4.2-4.4 GHz may cause RA receiver desensitization. This may be prevented with a reduction on 5G OOB emissions by filtering at the BSs. On the other hand, interference due to 5G in-band transmission may pose an issue for the coexistence between 5G BSs and RAs, as RAs may have poor frequency dependent rejection (FDR), and the 5G in-band radiation received by the RA may cause receiver overload (i.e., blocking).

The performance in terms of FDR may vary between different RA models. The international references on RA operation and technical characteristics may provide a wide range of protection levels against RA receiver overload. For example, technical characteristics of ten RA types have been presented with power threshold for receiver overload varying between −30 dBm and −56 dBm. The report filed with the FCC by the Radio Technical Commission for Aeronautics (RTCA) includes measurements of nine RA models grouped in three different use cases, namely "commercial air transport aircraft", "regional, business aviation, and general aviation aircraft", and "helicopters", as well as coexistence studies with 5G. A wide range of protection levels for RAs was also observed in the report. Additionally, the report claims that there is a major risk that 5G telecommunications systems in the 3.7-3.98 GHz band may cause harmful interference to radar altimeters on all types of civil aircraft.

FIG. 1 illustrates an example interference scenario. Specifically, the example of FIG. 1 illustrates a scenario for evaluation of interference into airplanes during the landing process (i.e., the Aircraft Cat III landing in glide slope). This scenario considers airport obstruction height limits set by the International Civil Aviation Organization (ICAO) Annex 14 to the Convention on International Civil Aviation for a straight-line approach path of a landing aircraft. As illustrated in the example of FIG. 1, a 5G BS with antenna deployed at a 25 m height is located at the landing route at the closest distance to the touchdown point allowed by aviation regulations (i.e., 1600 m). The 5G BS characteristics (e.g., transmit power and antenna radiation) may follow international references for sharing and compatibility studies at the relevant frequency range.

Figure 2:
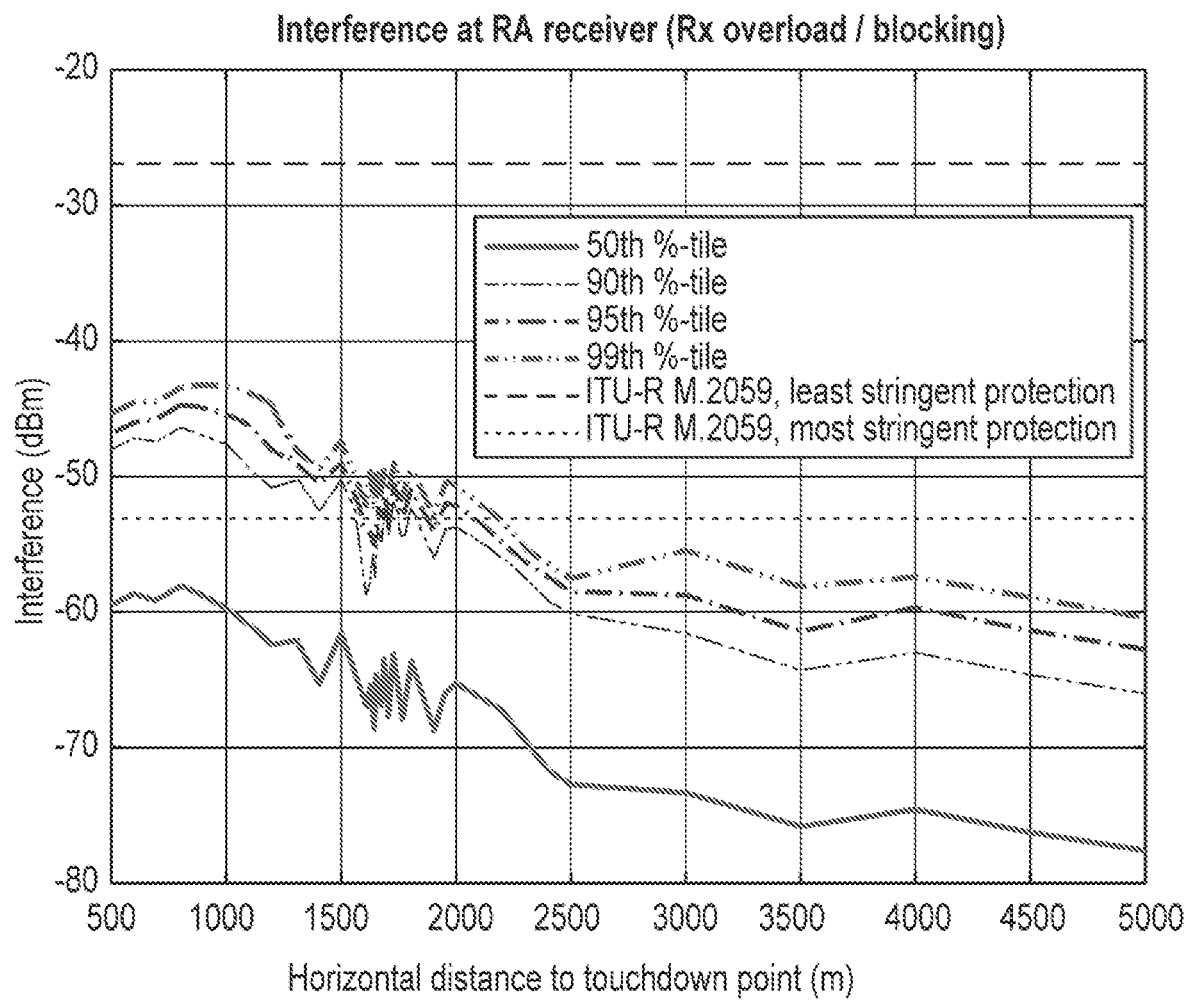
FIG. 2 illustrates an example of interference statistics at a radio altimeter (RA) receiver.

FIG. 2 illustrates an example of interference statistics at the RA receiver. In particular, the example of FIG. 2 illustrates interference statistics at the RA receiver due to a 5G BS located at the landing route, and at a distance of about 1.6 km from the airplane touchdown point. The statistics of the level of interference at the airplane's RA receiver due to the 5G BS in-band transmissions are plotted as results of Monte Carlo simulations, as well as the least and most stringent thresholds for RA receiver overload protection. As can be seen from the example of FIG. 2, the RAs with poorer FDR, and therefore more stringent protection levels, may be impacted by the 5G BS in-band transmissions during part of the landing route.

Figure 3:
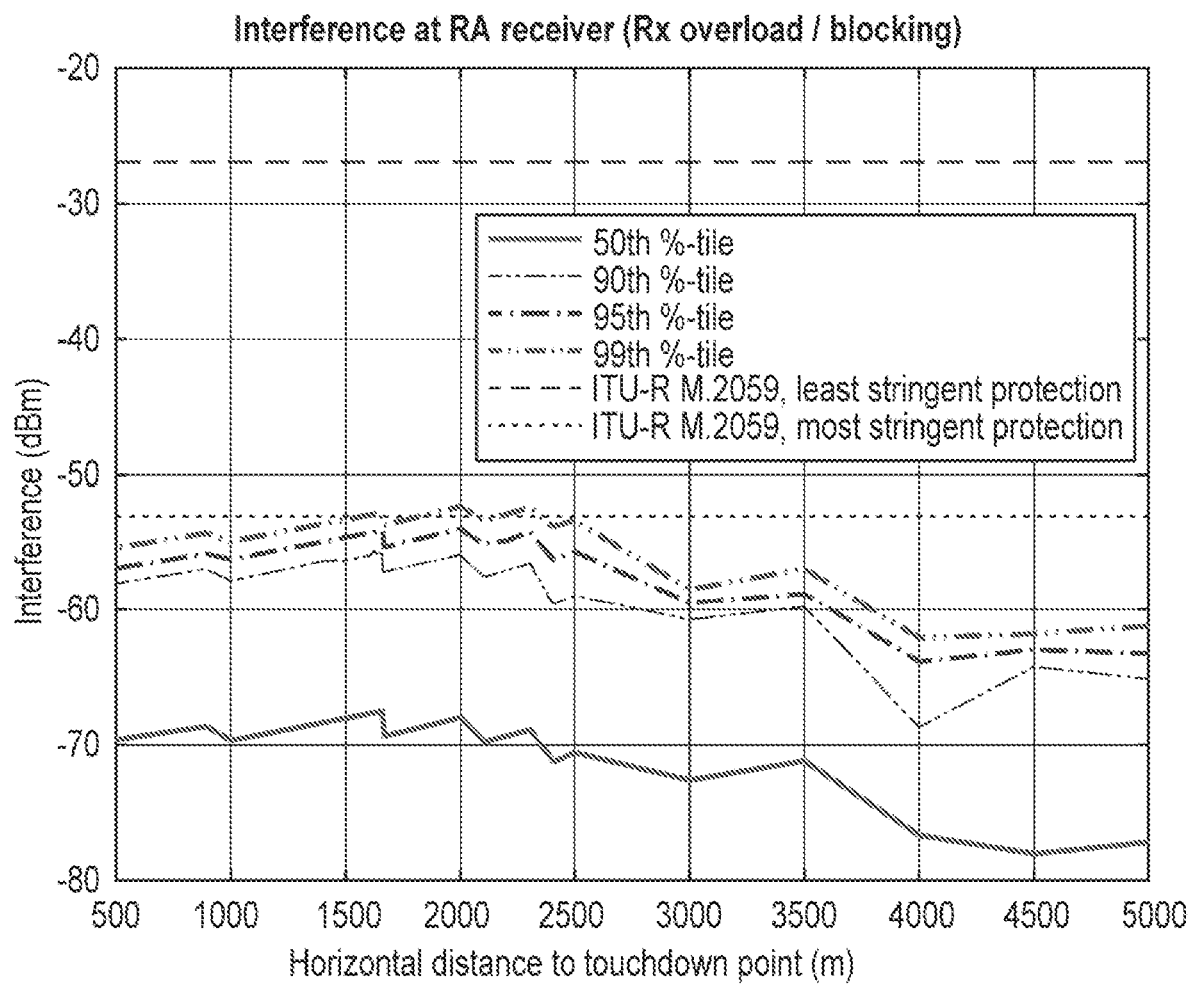
FIG. 3 illustrates another example of interference statistics at the RA receiver, according to certain example embodiments.

FIG. 3 illustrates another example of interference statistics at the RA receiver. In particular, the example of FIG. 3 illustrates interference statistics at the RA receiver due to a 5G BS located at the landing route at a distance of 4 km from the airplane touchdown point. In certain cases, 5G BSs placed in different locations may have different impacts on the airplane's RA receiver. In addition to the location of the 5G BS relative to the airplane's landing route, other aspects that may impact interference levels that the BS can cause to RAs may include the BS transmit power and antenna radiation pattern. Commercial 5G BS models may have different maximum transmit power and antenna characteristics. For example, the 5G BS EIRP limit determined by the FCC is 13.8 dB higher than the EIRP assumed in the examples of FIGS. 2 and 3. For the same antenna characteristics, the additional transmit power would translate proportionally into higher interference levels at the RA receiver, and an expanded area around the landing route where the radiation of the 5G BSs could cross the interference protection levels at the RA receiver.

In other cases, the dominant interfering 5G BS may change with the airplane location. Depending on the coupling loss (i.e., the combination between BS antenna gain towards the RA, path loss between the BS and RA, and RA antenna gain towards the BS), the dominant interfering 5G BS may be among the spatially closest BSs to the RA or a more distant one. It may also be possible that more than one 5G BS generates similar levels of interference at the RA receiver at a given time, which may need the consideration of aggregate interference for the protection of RAs. The above scenarios may address coexistence issues between 5G BSs and RAs in airplanes. Despite the different interference scenarios, similar issues may exist with RAs in helicopters. As discussed herein, certain example embodiments may provide solutions that can cover both cases.

Historically, the frequency ranges adjacent to the RA operating band, 4.2-4.4 GHz, have not had high power outdoor usage. This explains interference issues with RAs not being considered a problem until recently, when some of such frequency bands began to be considered for allocation to 5G/IMT. While filtering at the RA receiver may provide a technical solution to prevent RA receiver blocking, installing filters in airplanes and helicopters may not be practical. This would first require a global agreement involving the aviation industry, and then the logistics for equipment installation.

In certain cases, some countries, such as the UK, have decided to allocate to 5G/IMT frequency ranges adjacent to the lower part of the RA operating band for low power usage in a local licensing regime. However, for many other jurisdictions, such as the US and the European Union, the C-band (3.3-4.2 GHz) is considered a 5G-essential band with highly favorable conditions for high power macrocell deployments. Thus, drastic limitations on 5G BS power in frequencies adjacent to the RA operating band or no 5G deployment in many areas are highly undesirable.

A procedure concerning LTE BS power optimization has been proposed in the context of self-organizing network (SON). For this, eNBs may exchange the information on how much they are currently deviating from the network manager (NM)-configured power values. The NM then assures that the autonomous changes in transmit power do not affect the served areas of the neighborhood. A purpose of this procedure, for example, is to allow some power saving while preserving coverage quality. Despite also making use of SON, some example embodiments may be based on RA signal detection, formation of a cluster of BSs, and/or determination of actions to protect an RA by temporarily reducing the radiation.

Figure 4:
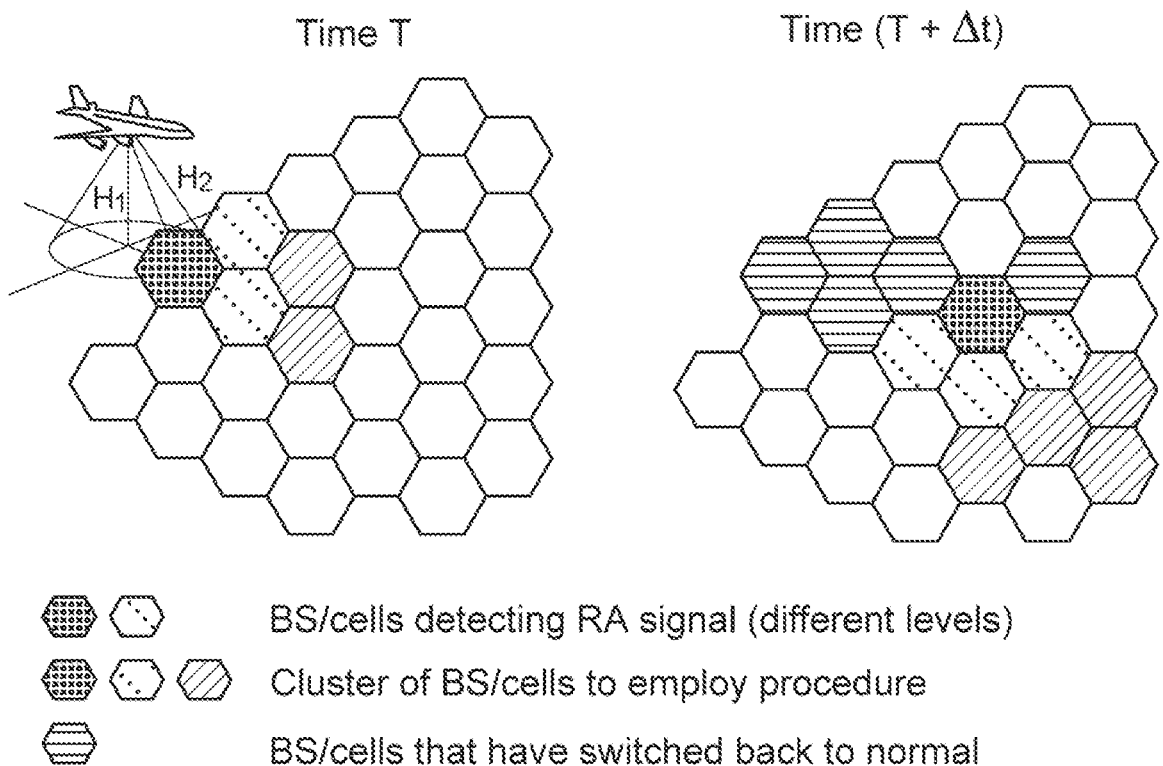
FIG. 4 illustrates an example procedure to reduce radiation levels of base stations (BSs), according to certain example embodiments.

FIG. 4 illustrates an example procedure to reduce radiation levels of BSs, according to certain example embodiments. In particular, FIG. 4 illustrates an example procedure of forming a cluster of BSs and determining actions to protect the RA by temporarily reducing the radiation levels of the relevant BSs. In certain example embodiments, one or more BSs may detect the presence of aeronautical RA to be protected by detecting an RA signal. In some example embodiments, the BSs that detect the presence of aeronautical RA may have RA measurement capability. For example, these BSs may have RA measurement capability to be able to detect the RA signal. These BSs may also measure the RA signal periodically, and take action once the RA signal level is above a certain threshold. However, in other example embodiments, it may not be necessary for all the BSs to be equipped with the capability of measuring/detecting the RA signal. Instead, according to certain example embodiments, it may be sufficient that the RA signal be detectable/detected by at least one BS. Additionally, some example embodiments may take advantage of the RA transmitted signal in the direction of the ground. The RA signal at 4.2-4.4 GHz may be measured or detected at different BSs by external/additional antenna(s)/receiver(s), or by using the BS capability of measuring or detecting signals at 4.2-4.4 GHz.

As illustrated in the example of FIG. 4, the BSs able to measure or detect the RA signal presence as well as the measured or detected signal level may change in time with the movement of the aircraft. According to certain example embodiments, a cluster of BSs to protect the aeronautical RA may be determined. In certain example embodiments, the cluster of BSs relevant to protect the RA may depend on the aircraft's positioning with respect to each BS site of the cluster of BSs. In some example embodiments, the aircraft's positioning may be estimated by multiple directive external and/or additional measurement antennas or receivers in the BS or BSs, or estimated by measurements by different transmission reception points (TRPs) of the BS at 4.2-4.4 GHz. Once a BS receives the RA signal measurements noted above, the NM may estimate the aircraft's positioning with respect to the BS sites and determine the BSs in the network that could cross an interference threshold at the RA receiver. For instance, as illustrated in the example of FIG. 4, there may be certain cells where the BSs can cause interference to the RA, but they may not be able to measure/detect the presence of the RA signal. Thus, according to certain example embodiments, with the RA positioning estimate and relevant information from the BSs, the NM may estimate the interference that each BS could cause to the RA. In addition, according to certain example embodiments, the cluster may be formed by the BSs that can generate interference to the RA that crosses a given protection threshold (i.e., an acceptable interference level).

In other example embodiments, after one or more BSs detect the RA presence in a given area via signal measurement, the NM may estimate the aircraft's positioning and determine the BSs that should make part of the cluster to protect that RA. As such, according to certain example embodiments, the cluster of BSs are not just made up of BSs that have detected the RA presence by measuring the RA signal, but may also include a number of BSs that do not detect the RA signal in their measurements. According to other example embodiments, the NM may be an independent entity or located in a BS capable of measuring the RA signal. Thus, in certain example embodiments, the BS that includes the NM may also determine the cluster of BSs in a similar manner as if the NM was an independent entity.

According to certain example embodiments, high accuracy on the aircraft's position estimate may not be needed, as conservative assumptions on the aircraft altitude may be made (low altitude assumed, according to aviation regulations). In some example embodiments, computation of estimated interference at the RA due to individual BSs may include information of BSs locations, antenna orientations, and radiation pattern envelope (static information). In other example embodiments, computation of the estimated interference at the RA due to individual BSs may need information of measurement antenna location, orientation, and gain or envelope (static information). In further example embodiments, computation of the estimated interference at the RA due to individual BSs may utilize information on reported RA detection (yes/no), with measured RA signal level associated with the measurement antenna and time of measurement. According to further example embodiments, computation of the estimated interference at the RA due to individual BSs may utilize information on conservative RA antenna gain and interference protection level.

According to certain example embodiments, with the displacement of the aircraft and the continuous update of RA signal measurement/detection, the cluster of BSs to employ the procedure described herein to protect the RA may also be updated, and some cells may leave the cluster, being set back to conventional operation (see FIG. 4). In certain example embodiments, the cluster of BSs to apply protective measures may be determined after the RA presence is detected, and the NM determines by interference measurements, which BSs should form the cluster. In some example embodiments, a BS that detects the RA signal may be part of the cluster, but in other example embodiments, this is not mandatory or a necessary condition. For instance, BSs that do not detect the RA signal in their measurements may cause interference to the RA with their beam steering, and therefore may also be part of the cluster. According to other example embodiments, the cluster may be formed by one or a combination of BSs that measure the RA signal, BSs that have the capability to measure the RA signal, but are not detecting any RA signal in the moment, and BSs that do not have the capability to measure the RA signal. In other example embodiments, a BS may be part of the cluster based on a determination of the NM from, for example, calculations that the BS is able to cause interference to the RA at a level beyond a certain protection threshold. In other words, the cluster of BSs may be formed by BSs identified by the NM to have to take some action (e.g., reduce emissions) to protect the RA, while other BSs may operate normally.

Certain example embodiments may determine the temporary reduction on emissions for BSs in the cluster. For instance, according to certain example embodiments, the reduction on BS emissions may be calculated as the difference between estimated BS interference at the RA (done for determining the BS cluster) and the interference protection level. In certain example embodiments, each BS of the BS cluster may create different levels of interference at the RA due to the specific location of each BS (e.g., antenna pattern, etc.). According to certain example embodiments, each BS in the cluster may reduce its transmission power by different levels. In some example embodiments, a margin to account for aggregate interference may be considered. In certain example embodiments, the margin may represent certain computation error(s) or measurement uncertainty level. For instance, in some example embodiments, the margin may refer to further reducing the BS emission (i.e., consider additional margin) to protect the RA from the sum of interference coming from more than one BS at the same time. In other example embodiments, the margin may be zero, in which there may be no need for a margin. With the BS interference estimate referring to the maximum BS transmit power, the calculated temporary reduction may define the percentage of total BS resources allowed to be used in downlink (DL) for reduced emissions. According to certain example embodiments, this may be implemented by restricting resource block (RB) usage in DL to the calculated allowable percentage of total BS resources, and/or by decreasing BS transmit power according to the calculated allowable percentage of total BS resources. Additionally, in certain example embodiments, if the radiation patterns of the multiple beam modes of the BSs are available, the NM may perform the calculations described above, including the computation of estimated interference at the RA per BS beam mode. In this case, the NM may directly indicate to each BS in the cluster of BSs, the beam modes the BS should temporarily disable to protect the RA.

Figure 5:
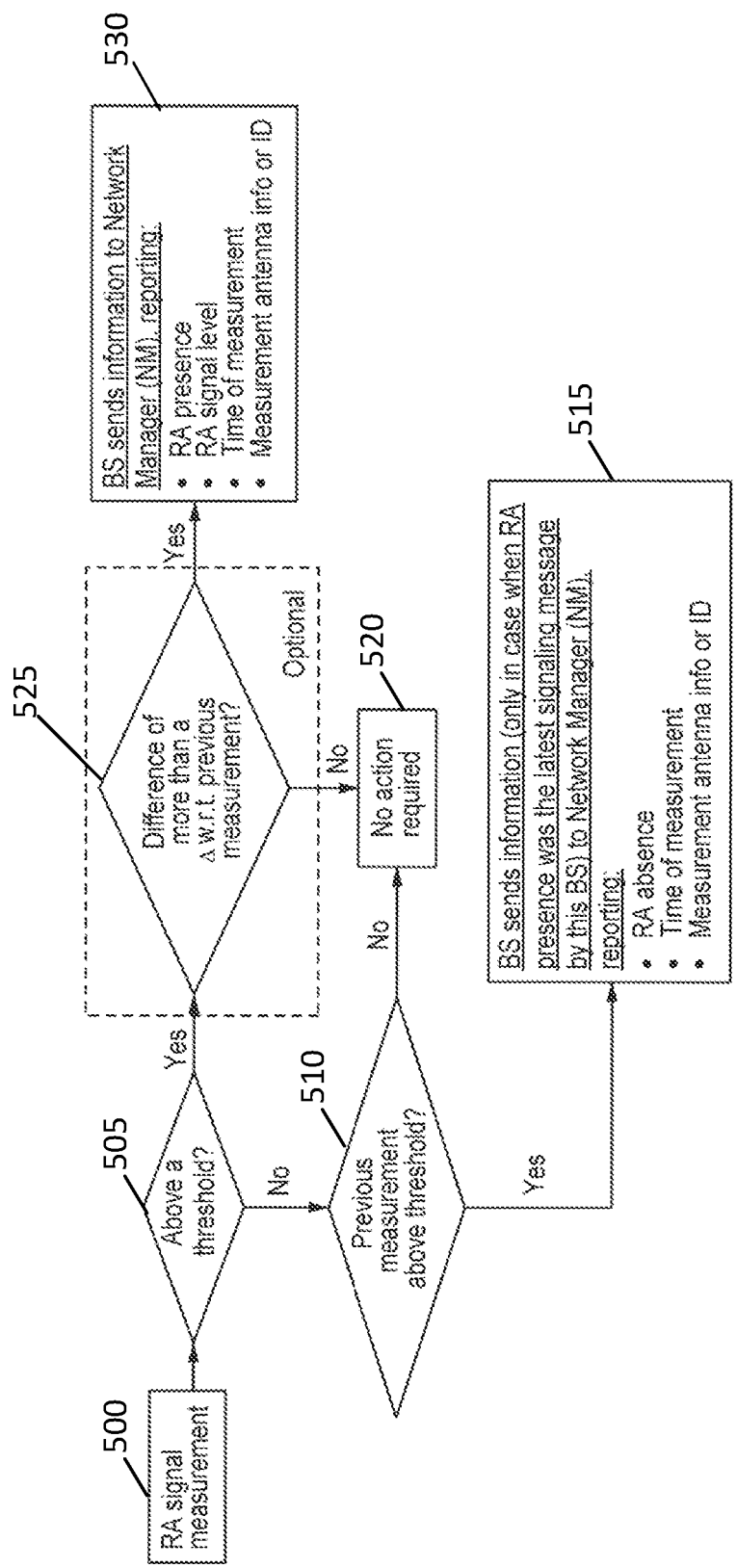
FIG. 5 illustrates an example base station reporting of RA signal detection, according to certain example embodiments.

FIG. 5 illustrates an example BS reporting of RA signal detection, according to certain example embodiments. Certain example embodiments may be based on RA signal detection, formation of a cluster of BSs and determination of actions to protect a RA by temporarily reducing the radiation levels of the relevant BSs. As illustrated in the example of FIG. 5, the BS (e.g., one or more BSs from the cluster) may report RA signal detection. Specifically, process of reporting RA signal detection by the BS may begin at 500, where the BS detects or measures the RA signal. According to certain example embodiments, the measurement or detection of the RA signal may have multiple options for implementation. For example, one option may be based on external antenna(s)/receiver(s) in addition to the existing BS antennas, and another option may be based on the BS capability of measuring or detecting the RA signal at 4.2-4.4 GHz. In certain example embodiments, these measurements may be performed with some pre-defined periodicity, or triggered by the NM. Furthermore, in some example embodiments, the BS with the ability to measure the RA signal may be the BS that performs the reporting. In addition, according to certain example embodiments, the NM may decide to use the RA level measurement from specific BSs.

According to certain example embodiments, once a RA signal measurement is available, at 505, the BS may compare the measured RA signal level to a pre-defined threshold. For instance, in certain example embodiments, the BS may determine whether the measured RA signal is below the threshold. If so, this may provide an indication of the absence of reportable RA signal(s) (i.e., "RA absence"). In order to optimize the communication with the NM, a continuous "RA absence" may not need to be informed by the BS. However, in certain example embodiments, the communication of "RA absence" information may be important for the update of the cluster of BSs when the BS measurement switches from "RA presence" (RA signal level above the threshold) to "RA absence". Thus, at 510, by measuring the RA signal level below the threshold, the BS may check if the previous measurement was above the threshold. If yes, then, at 515, the BS may send information to the NM reporting "RA absence" and additional information, such as "time of measurement" and "measurement antenna information or ID". If no, then, at 520, no action is required.

According to certain example embodiments, at 505, the BS may measure an RA signal level that is equal to or above the threshold. In certain example embodiments, this may indicate the presence of reportable RA signal (i.e., "RA presence"). Information reported by the BS to NM may include the indication of RA signal presence and the measured "RA signal level", the "time of measurement", and the "measurement antenna info or ID". According to certain example embodiments, in order to optimize the communication with the NM, an optional implementation may avoid the BS sending consecutive "RA presence" information when there is no relevant difference between the measured RA signal level and the latest RA signal level reported to the NM, i.e., if the difference between them is not above a certain pre-defined value, A. Thus, if the RA signal is determined to be above a threshold at 505, then, at 525, the BS may check if the difference between the measured RA signal level and the latest RA signal level reported to the NM is above A. If yes, then, at 530, the BS may send updated information to the NM including "RA presence", RA signal level", "time of measurement", and "measurement antenna info or ID". If no, then, at 520, no action is required.

Figure 6:
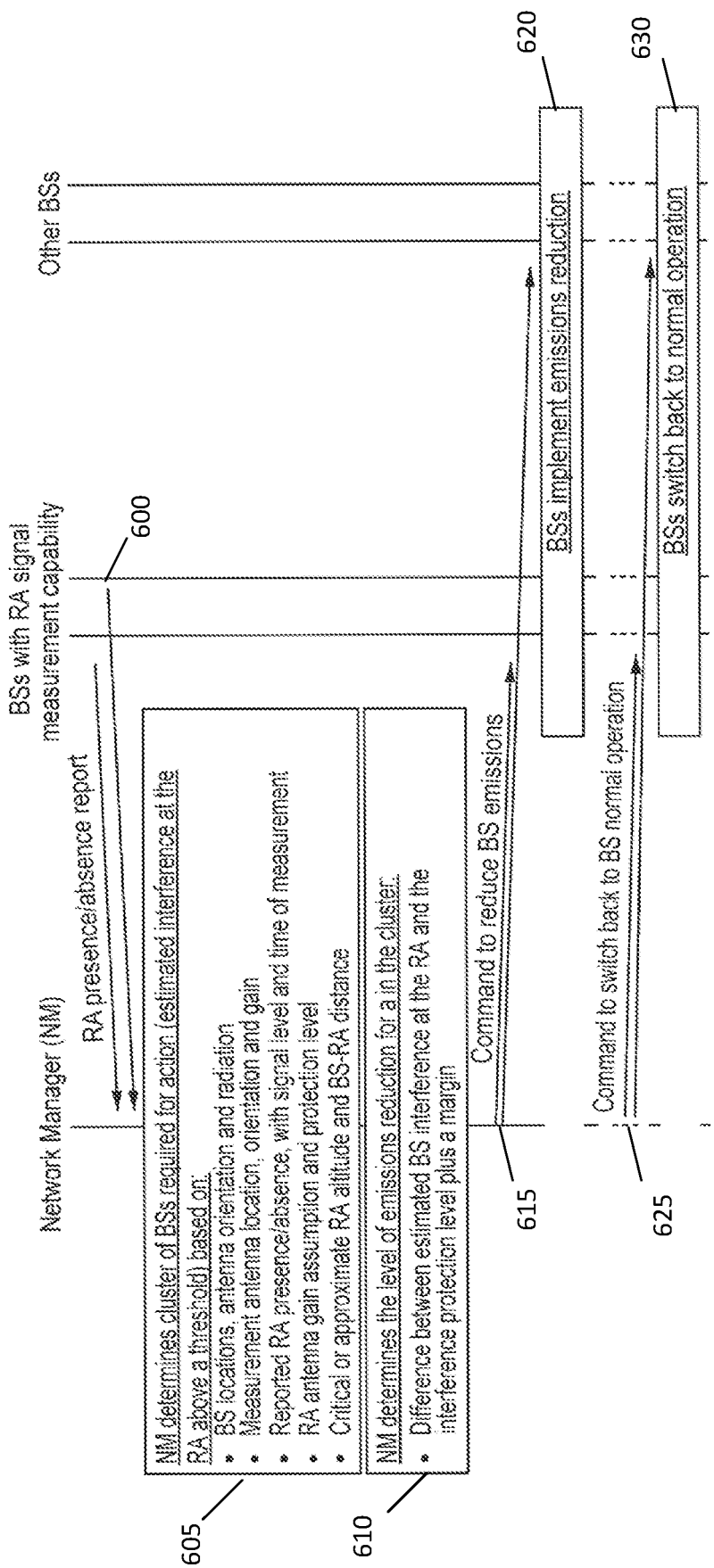
FIG. 6 illustrates an example signal flow between BSs and a network manager, according to certain example embodiments.

FIG. 6 illustrates an example signal flow between BSs and NM, according to certain example embodiments. Although the example of FIG. 6 illustrates signals between certain BSs and the NM, certain example embodiments may not require all BSs involved to be equipped with RA signal measurement/detection capabilities. However, in certain example embodiments, each BS in the network may receive commands from the NM to take a certain action (e.g., temporarily reduce usage of DL resources) to protect RAs.

As illustrated in the example of FIG. 6, at 600, one or more BSs with RA signal measurement capability may send an RA presence or absence report to the NM. At 605, the NM may determine the cluster of BSs required for action (estimated interference at the RA above a threshold) based on a set of a plurality of BS locations, antenna orientation and radiation, measurement antenna location, orientation and gain, reported RA presence or absence with signal level and time of measurement, RA antenna gain assumption and protection level, or critical or appropriate RA altitude and BS-RA distance. At 610, the NM may determine the level of emissions reduction for the BSs in the cluster. For example, the NM may determine the difference between an estimated BS interference at the RA and the interference protection level plus a margin. In certain example embodiments, the level of emissions or transmit power may be defined as for example, a measurement, an amount, a quantity, a threshold, a range, etc. At 615, the NM may transmit a command to the BSs with RA signal measurement capability and other BSs to reduce the BS emissions. At 620, the BSs with RA signal measurement capability and the other BSs may implement the emissions reduction according to the command received from the NM at 615. At 625, the NM may transmit a command to the BSs with RA signal measurement capability and the other BSs to switch back to BS normal operation. At 630, the BSs with RA signal measurement capability and the other BSs may switch back to normal operation according to the command received from the NM at 625.

According to certain example embodiments, with the displacement of the aircraft and the continuous update of RA presence or absence conditions, the cluster of BSs to employ the procedure to protect the RA may also be updated, and some cells may be set back to conventional operation. Additionally, the calculated temporary reduction on BS radiation may define the percentage of total BS resources allowed to be used in DL. According to certain example embodiments, this may be a command to be sent by the NM to each BS in the cluster, and the BS may implement the command by restricting RB usage in DL or BS transmit power accordingly. Alternatively, in other example embodiments where the radiation patterns of the multiple beam modes of the BSs are available, the NM may communicate to each BS the beam modes identified by the NM as the ones to be disabled to protect the RA.

Figure 7:
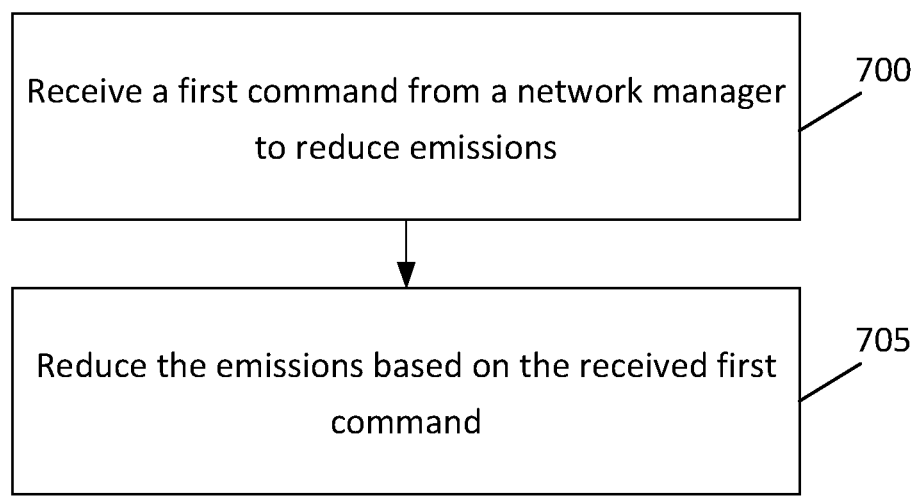
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, network node, or a group of multiple network elements in a 3GPP system, such as LTE or 5G-NR. For instance, in an example embodiment, the method of FIG. 7 may be performed by a BS, eNB and/or gNB, for instance similar to apparatus 10 illustrated in FIG. 9(*a*).

According to certain example embodiments, the method of FIG. 7 may include, at 700, receiving a first command from a network manager to reduce emissions. Further, at 705, the method may include reducing the emissions based on the received first command According to certain example embodiments, the first command may be for one or more network nodes in a cluster including the network node.

According to certain example embodiments, the method may further include measuring a radio altimeter signal. According to other example embodiments, the method may also include sending a measurement report to the network manager. According to further example embodiments, the method may also include at least one of comparing the measured radio altimeter signal with a pre-defined threshold, comparing a previously measured radio altimeter signal with the pre-defined threshold, or comparing a difference between the measured radio altimeter signal and the previously measured radio altimeter signal with a pre-defined value. According to other example embodiments, the measurement report may include at least one of a result from measuring the radio altimeter signal, a result of the comparison, location information of the network nodes, antenna orientation and radiation of the network nodes, measurement antenna location, orientation, and gain of the network nodes, radio altimeter presence or absence with signal level and time of measurement, radio altimeter gain assumption and protection level, or a critical or approximate radio altimeter altitude and distance between the network node and a radio altimeter.

In certain example embodiments, the cluster may be determined based on the measurement report. In other example embodiments, the cluster may be determined by at least one of the network node or the network manager. In some example embodiments, the reducing the emissions may include at least one of reducing transmit power, radio resource restriction, or beam muting. According to certain example embodiments, the method may also include receiving a second command, and switching to normal operation based on the second command According to further example embodiments, the radio altimeter signal may be measured by at least one of multiple directive external or additional measurement antennas or receivers in the network node, or different transmission reception points of the network node.

In some example embodiments, measuring the radio altimeter signal may be performed with a pre-defined periodicity, or triggered by the network manager. In other example embodiments, the measurement report may include at least one of a radio altimeter absence indication, a radio altimeter presence indication, a time of the measurement, or measurement antenna information or measurement antenna identification. In certain example embodiments, determining the cluster of network nodes may include determining at least one network node that does not measure the radio altimeter signal. According to certain example embodiments, the at least one network node may include the network node.

Figure 8:
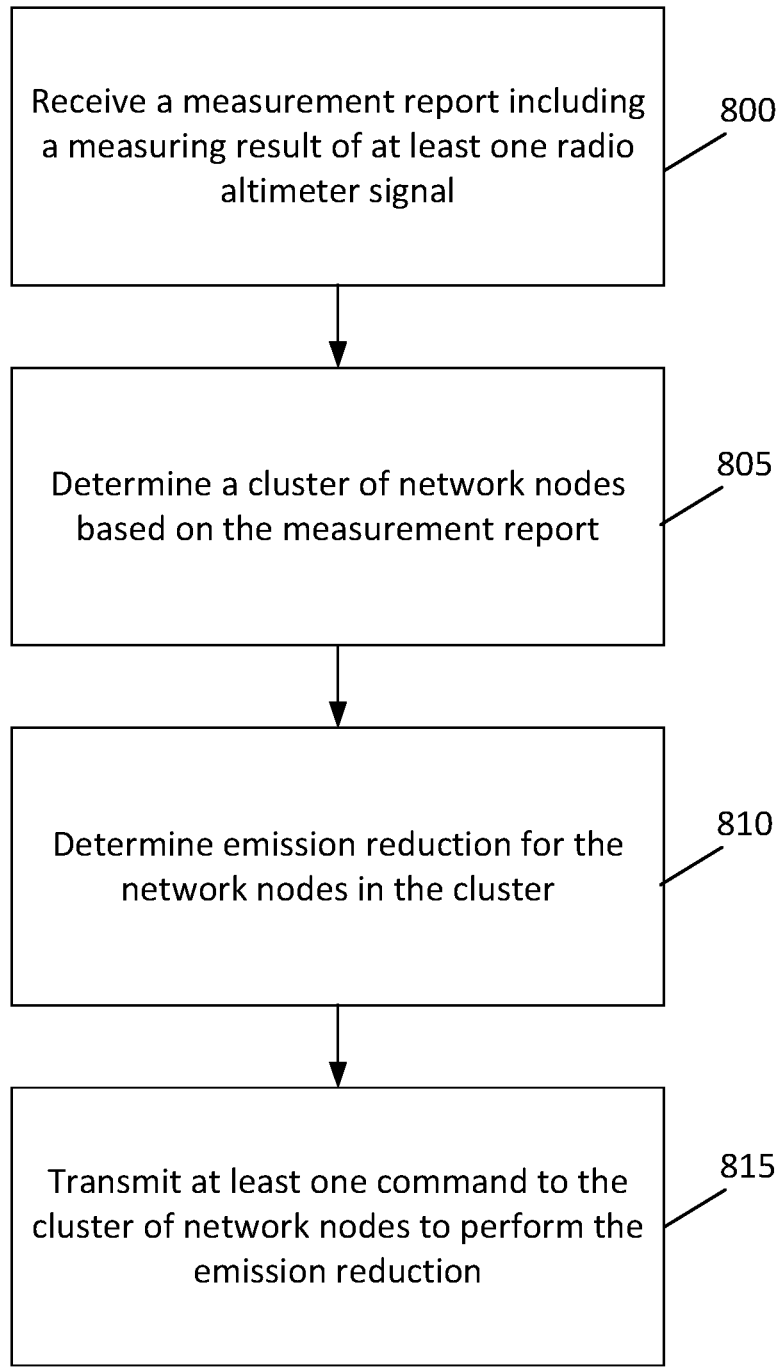
FIG. 8 illustrates an example flow diagram of another method, according to certain example embodiments.

FIG. 8 illustrates an example flow diagram of another method, according to certain example embodiments. In an example embodiment, the method of FIG. 8 may be performed by a network entity, network node, or a group of multiple network elements in a 3GPP system, such as LTE or 5G-NR. For instance, in an example embodiment, the method of FIG. 8 may be performed by a NM, for instance similar to apparatus 20 illustrated in FIG. 9(*b*).

According to certain example embodiments, the method of FIG. 8 may include, at 800, receiving a measurement report including a measuring result of at least one radio altimeter signal. The method may also include, at 805, determining a cluster of network nodes based on the report. The method may further include, at 810, determining emission reduction for the network nodes in the cluster. Further, the method may include, at 815, transmitting at least one command to the cluster of network nodes to perform the emission reduction.

According to certain example embodiments, the determination of the emission reduction for the network nodes in the cluster may include determining a level of emission reduction for the network nodes in the cluster. According to other example embodiments, the measurement report may include at least one of locations of the network nodes, antenna orientation and radiation of the network nodes, measurement antenna location, orientation, and gain, radio altimeter presence or absence with signal level and time of measurement, radio altimeter gain assumption and protection level, or a critical or approximate radio altimeter altitude and distance between the network node and a radio altimeter. According to other example embodiments, the emission reduction may include determining a level of emission reduction for the network nodes in the cluster by determining a difference between an estimated network node interference at a radio altimeter and an interference protection level plus a margin.

In certain example embodiments, the method may also include estimating a radio altimeter's position with respect to a plurality of network nodes, wherein the cluster of network nodes relevant to a radio altimeter may be dependent upon an aircraft's position. In some example embodiments, the radio altimeter's position is estimated by at least one of a plurality of directive external measurement antennas or receivers in a network node of the cluster, or different transmission reception points of a network node. In other example embodiments, in addition to the measurement report, the cluster may be determined based on a location of the network node and an interference level caused by the network node.

Figure 9A:
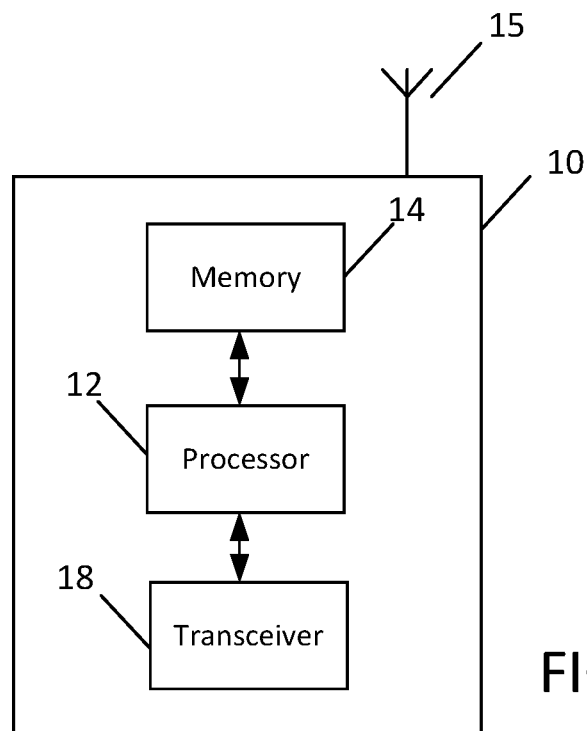
FIG. 9(a) illustrates an apparatus, according to certain example embodiments.

FIG. 9(*a*) illustrates an apparatus 10 according to certain example embodiments. In certain example embodiments, apparatus 10 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 10 may include components or features not shown in FIG. 9(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9(*a*).

As illustrated in the example of FIG. 9(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive a first command from a network manager to reduce emissions. Apparatus 10 may also be controlled by memory 14 and processor 12 to reduce the emissions based on the received first command According to certain example embodiments, the first command may be for one or more network nodes in a cluster including the apparatus.

Figure 9B:
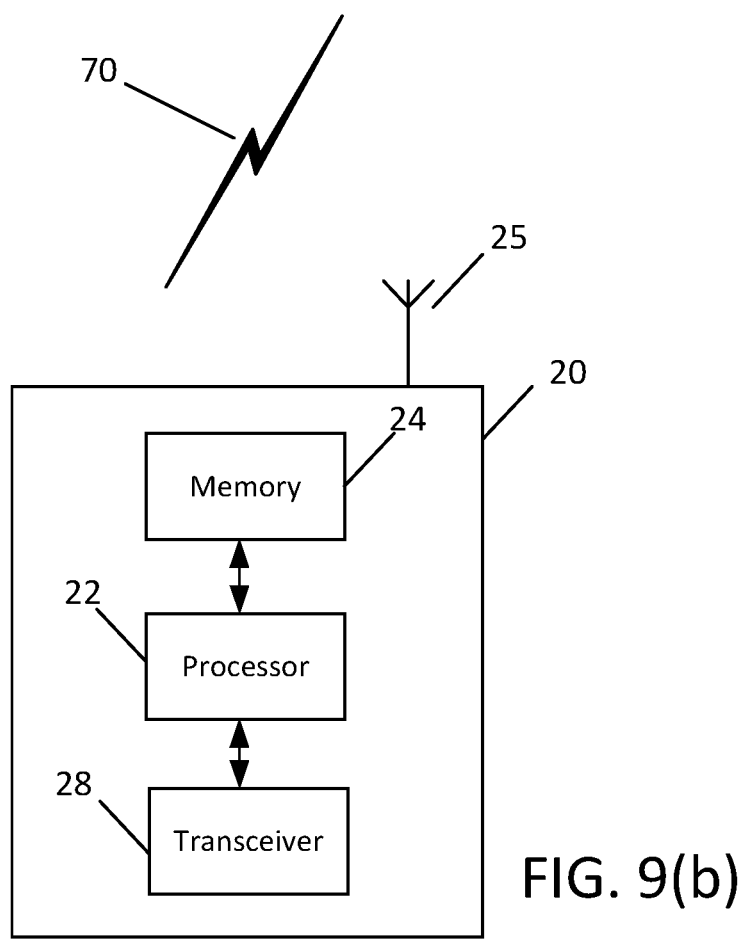
FIG. 9(b) illustrates another apparatus, according to certain example embodiments.

FIG. 9(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, and/or WLAN access point, associated with a radio access network (RAN), such as an LTE network, 5G or NR. It should be noted that one of ordinary skill in the art would understand that apparatus 20 may include components or features not shown in FIG. 9(b).

As illustrated in the example of FIG. 9(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6 and 8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6 and 8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to receive a measurement report including a measuring result at least one radio altimeter signal. Apparatus 20 may also be controlled by memory 24 and processor 22 to determine a cluster of network nodes based on the measurement report. Apparatus 20 may further be controlled by memory 24 and processor 22 to determine emission reduction for the network nodes in the cluster. Further, apparatus 20 may be controlled by memory 24 and processor 22 to transmit at least one command to the cluster of network nodes to perform the emission reduction.

Certain example embodiments may be directed to an apparatus that includes means for performing any of the methods described herein including, for example, means for determining the aircraft's positioning. In other example embodiments, the apparatus may include means for receiving a first command from a network manager to reduce emissions. The apparatus may also include means for reducing the emissions based on the received first command In certain example embodiments, the first command may be for one or more network nodes in a cluster including the apparatus.

Other example embodiments may be directed to an apparatus that includes means for receiving a measurement report including a measuring result of at least one radio altimeter signal. The apparatus may also include means for determining a cluster of network nodes based on the measurement report. The apparatus may further include means for determining emission reduction for the network nodes in the cluster. In addition, the apparatus may include means for transmitting at least one command to the cluster of network nodes to perform the emission reduction.

Certain example embodiments described herein provide several technical improvements, enhancements, and/or advantages. In some example embodiments, it may be possible to reduce the usage of DL resources to maintain the BS radiation at safe levels with respect to the protection of RAs. This may be applicable to the relevant BSs and during the time this is needed. Thus, certain example embodiments may allow operation of higher-power BSs with minimal impact on the cellular network performance in bands adjacent to aeronautical RAs, while still protecting them. Additionally, certain example embodiments may be applicable to cellular networks (e.g., 5G LTE, 5G NR) operating in frequency bands adjacent to aeronautical radio altimeters 4.2-4.4 GHz band. Further, Bands adjacent to the lower part of the radio altimeter band may be envisaged to 5G deployment, but also bands above 4.4 GHz may become available for 5G/IMT.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
BS Base Station
DL Downlink
EIRP Equivalent Isotropically Radiated Power
eNB Enhanced Node B
FDR Frequency Dependent Rejection
gNB 5G or Next Generation NodeB
IMT International Mobile Telecommunications
LTE Long Term Evolution
NM Network Manager
NR New Radio
OOB Out-Of-Band
RA Radio Altimeter
SON Self-Organized Network
UE User Equipment

We claim:

1. A method, comprising:
measuring a radio altimeter signal;
sending a measurement report to a network manager;
receiving, at a network node, a first command from the network manager to reduce emissions; and
reducing the emissions based on the received first command,
wherein the first command is for one or more network nodes in a cluster including the network node.

2. An apparatus, comprising:
at least one processor; and
at least one memory comprising computer program code,
the at least one memory and the computer program code are configured, with the at least one processor, to cause the apparatus at least to
measure a radio altimeter signal;
send a measurement report to a network manager;
receive a first command from the network manager to reduce emissions; and
reduce the emissions based on the received first command,
wherein the first command is for one or more network nodes in a cluster including the apparatus.

3. The apparatus according to claim 2, wherein the at least one memory and the computer program code are further configured, with the at least one processor, to cause the apparatus at least to:
compare the measured radio altimeter signal with a pre-defined threshold,
compare a previously measured radio altimeter signal with the pre-defined threshold, or
compare a difference between the measured radio altimeter signal and the previously measured radio altimeter signal with a pre-defined value.

4. The apparatus according to claim 3, wherein the measurement report comprises at least one of:
a result from measuring the radio altimeter signal,
a result of the comparison,
location information of the network nodes,
antenna orientation and radiation of the network nodes,
measurement antenna location, orientation, and gain of the network nodes,
radio altimeter presence or absence with signal level and time of measurement,
radio altimeter gain assumption and protection level, or
a critical or approximate radio altimeter altitude and distance between the apparatus and a radio altimeter.

5. The apparatus according to claim 2, wherein the cluster is determined based on the measurement report.

6. The apparatus according to claim 2, wherein the cluster is determined by at least one of the apparatus or the network manager.

7. The apparatus according to claim 2, wherein the reducing the emissions comprises at least one of:
reducing transmit power,
radio resource restriction, or
beam muting.

8. The apparatus according to claim 2, wherein the at least one memory and the computer program code are further configured, with the at least one processor, to cause the apparatus at least to:
receive a second command; and
switch to normal operation based on the second command.

9. The apparatus according to claim 2, wherein the radio altimeter signal is measured by at least one of:
multiple directive external or additional measurement antennas or receivers in the apparatus, or
different transmission reception points of the apparatus.

10. The apparatus according to claim 2, wherein measuring the radio altimeter signal is performed with a pre-defined periodicity, or triggered by the network manager.

11. The apparatus according to claim 2, wherein the measurement report comprises at least one of a radio altimeter absence indication, a radio altimeter presence indication, a time of the measurement, or measurement antenna information or measurement antenna identification.

12. The apparatus according to claim 2, wherein determination of the cluster of network nodes comprises the at least one memory and the computer program code being configured, with the at least one processor, to cause the apparatus at least to:

determine at least one network node that does not measure the radio altimeter signal.

13. An apparatus, comprising:

at least one processor; and at least one memory comprising computer program code, the at least one memory and the computer program code are configured, with the at least one processor, to cause the apparatus at least to receive a measurement report including a measuring result of at least one radio altimeter signal;

determine a cluster of network nodes based on the measurement report;

determine emission reduction for the network nodes in the cluster; and transmit at least one command to the cluster of network nodes to perform the emission reduction.

14. The apparatus according to claim 13, wherein the determination of the emission reduction for the network nodes in the cluster comprises determining a level of emission reduction for the network nodes in the cluster.

15. The apparatus according to claim 13, wherein the measurement report comprises at least one of:

location information of the network nodes, antenna orientation and radiation of the network nodes, measurement antenna location, orientation, and gain, radio altimeter presence or absence with signal level and time of measurement, radio altimeter gain assumption and protection level, or a critical or approximate radio altimeter altitude and distance between the network node and a radio altimeter.

16. The apparatus according to claim 13, wherein the emission reduction comprises the at least one memory and the computer program code being further configured, with the at least one processor, to cause the apparatus at least to:

determine a level of emission reduction for the network nodes in the cluster by determining a difference between an estimated network node interference at a radio altimeter and an interference protection level plus a margin.

17. The apparatus according to claim 13, wherein the at least one memory and the computer program code are further configured, with the at least one processor, to cause the apparatus at least to:

estimate a radio altimeter's position with respect to a plurality of network nodes, wherein the cluster of network nodes relevant to a radio altimeter is dependent upon an aircraft's position.

18. The apparatus according to claim 17, wherein the radio altimeter's position is estimated by at least one of:

a plurality of directive external measurement antennas or receivers in a network node of the cluster, or different transmission reception points of a network node.

19. The apparatus according to claim 13, wherein in addition to the measurement report, the cluster is determined based on a location of the network node and an interference level caused by the network node.

* * * * *